United States Patent
Park et al.

(10) Patent No.: US 11,272,529 B2
(45) Date of Patent: Mar. 8, 2022

(54) METHOD AND DEVICE FOR TRANSMITTING/RECEIVING RADIO SIGNAL IN WIRELESS COMMUNICATION SYSTEM

(71) Applicant: LG Electronics Inc., Seoul (KR)

(72) Inventors: Changhwan Park, Seoul (KR); Seokmin Shin, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 16/633,683

(22) PCT Filed: Aug. 10, 2018

(86) PCT No.: PCT/KR2018/009167
§ 371 (c)(1),
(2) Date: Jan. 24, 2020

(87) PCT Pub. No.: WO2019/013191
PCT Pub. Date: Feb. 14, 2019

(65) Prior Publication Data
US 2021/0160911 A1 May 27, 2021

Related U.S. Application Data

(60) Provisional application No. 62/543,926, filed on Aug. 10, 2017, provisional application No. 62/547,773, filed on Aug. 19, 2017, provisional application No. 62/586,206, filed on Nov. 15, 2017, provisional application No. 62/630,841, filed on Feb. 15, 2018.

(30) Foreign Application Priority Data

Apr. 12, 2018 (KR) .......................... 10-2018-0042630

(51) Int. Cl.
*H04W 4/00* (2018.01)
*H04W 72/12* (2009.01)
(Continued)

(52) U.S. Cl.
CPC ....... *H04W 72/1289* (2013.01); *H04L 5/0053* (2013.01); *H04W 4/80* (2018.02);
(Continued)

(58) Field of Classification Search
USPC .................................. 370/328, 329, 330, 331
See application file for complete search history.

(56) References Cited

U.S. PATENT DOCUMENTS 10,623,931 B2 * 4/2020 Park .......................... H04L 1/08
2013/0010619 A1 1/2013 Fong et al.
(Continued)

FOREIGN PATENT DOCUMENTS

WO 2017069470 A1 4/2017

OTHER PUBLICATIONS

Nokia, Alcatel-Lucent Shanghai Bell, "On cross-carrier scheduling and joint UCI design", 3GPP TSG RAN WG1 NR#2, Jun. 27-30, 2017, R1-1710885.
(Continued)

*Primary Examiner* — David Q Nguyen
(74) *Attorney, Agent, or Firm* — Dentons US LLP

(57) ABSTRACT

Disclosed are a method for a base station and a UE transmitting/receiving a signal in a wireless communication system, and a device supporting same. According to one embodiment, a method for a UE transmitting/receiving a signal in a wireless communication system comprises the steps of: receiving, from a base station, configuration information about a carrier for one or more channel; and, on the basis of the received configuration information, transmitting and then receiving one or more channel. Therein, the one or more channel comprises at least one among a downlink control channel, a downlink shared channel and an uplink shared channel, and the carrier may be configured differently based on the channel being transmitted therethrough.

14 Claims, 13 Drawing Sheets

(51) Int. Cl.
*H04W 72/04* (2009.01)
*H04L 5/00* (2006.01)
*H04W 4/80* (2018.01)
*H04W 80/02* (2009.01)
*H04W 76/27* (2018.01)

(52) U.S. Cl.
CPC ... *H04W 72/0453* (2013.01); *H04W 72/1257* (2013.01); *H04W 76/27* (2018.02); *H04W 80/02* (2013.01)

(56) References Cited

U.S. PATENT DOCUMENTS

| | | | |
|---|---|---|---|
| 2014/0126485 | A1 | 5/2014 | Chen et al. |
| 2018/0048985 | A1* | 2/2018 | Park ......................... H04W 4/70 |
| 2019/0223156 | A1* | 7/2019 | Fujishiro ............. H04L 65/4076 |
| 2019/0223197 | A1* | 7/2019 | Shin .................... H04W 72/042 |
| 2019/0246254 | A1* | 8/2019 | Chatterjee ............. H04L 5/0053 |
| 2019/0335428 | A1* | 10/2019 | Bendlin ............... H04W 72/042 |
| 2020/0015262 | A1* | 1/2020 | Ahn ...................... H04W 48/10 |
| 2020/0037287 | A1* | 1/2020 | Zhang .................. H04L 5/0073 |
| 2020/0187256 | A1* | 6/2020 | Lim .................... H04W 72/042 |
| 2020/0396722 | A1* | 12/2020 | Han .......................... H04L 1/18 |

OTHER PUBLICATIONS

Huawei, HiSilicon, KT, CATR, Media Tek, Nokia, ASB, Ericsson, Intel, [LGE], "Way Forward on NR Carrier Aggregation", 3GPP TSG RAN WG1 NR Ad-Hoc Meeting, Jun. 27-30, 2017, R1-1711846.

* cited by examiner

METHOD AND DEVICE FOR TRANSMITTING/RECEIVING RADIO SIGNAL IN WIRELESS COMMUNICATION SYSTEM

This application is a National Stage Entry of International Application No. PCT/KR2018/009167 filed Aug. 10, 2018, which claims the benefit of U.S. Provisional Application Nos. 62/543,926 filed Aug. 10, 2017; 62/547,773 filed Aug. 19, 2017; 62/586,206 filed Nov. 15, 2017; 62/630,841 filed Feb. 15, 2018 and Korean Patent Application No. 10-2018-0042630 filed Apr. 12, 2018, all of which are hereby incorporated by reference in their entirety for all purposes as if fully set forth herein.

TECHNICAL FIELD

The present disclosure relates to a wireless communication system and, more particularly, to a method and apparatus for transmitting and receiving a radio signal. The wireless communication system includes a narrowband Internet of Things (NB-IoT)-based wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF THE DISCLOSURE

Technical Problems

An object of the present disclosure is to provide a method of efficiently performing a radio signal transmission and reception process and an apparatus therefor.

The objects that can be achieved with the present disclosure are not limited to what has been particularly described hereinabove and other objects not described herein will be more clearly understood by persons skilled in the art from the following detailed description.

Technical Solutions

In accordance with an embodiment, provided herein is a method of transmitting and receiving a signal by a user equipment (UE) in a wireless communication system, including receiving configuration information about a carrier for one or more channels from a base station (BS), and transmitting and receiving the one or more channels based on the received configuration information. The one or more channels may include at least one of a downlink control channel, a downlink shared channel, or an uplink shared channel. The carrier may be differently configured based on a channel transmitted through the carrier.

In accordance with an embodiment, provided herein is a method of transmitting and receiving a signal by a base station (BS) in a wireless communication system, including transmitting configuration information about a carrier for one or more channels to a user equipment (UE), and transmitting and receiving the one or more channels based on the configuration information. The one or more channels may include at least one of a downlink control channel, a downlink shared channel, or an uplink shared channel. The carrier may be differently configured based on a channel transmitted through the carrier.

In accordance with an embodiment, provided herein is a user equipment (UE) operating in a wireless communication system, including a transceiver and a processor. The processor may receive configuration information about a carrier for one or more channels from a base station (BS), and transmit and receives the one or more channels based on the received configuration information. The one or more channels may include at least one of a downlink control channel, a downlink shared channel, or an uplink shared channel. The carrier may be differently configured based on a channel transmitted through the carrier.

In accordance with an embodiment, provided herein is a base station (BS) operating in a wireless communication system, including a transceiver and a processor. The processor may transmit configuration information about a carrier for one or more channels to a user equipment (UE) and transmit and receive the one or more channels based on the configuration information. The one or more channels may include at least one of a downlink control channel, a downlink shared channel, or an uplink shared channel. The carrier may be differently configured based on a channel transmitted through the carrier.

In accordance with an embodiment, based on the one or more channels including the downlink control channel, the downlink control channel may include a narrowband physical downlink control channel (NPDCCH), the carrier may include one or more carriers for monitoring the NPDCCH, and the one or more carriers for monitoring the NPDCCH may be differently configured based on at least one of a search space for monitoring the NPDCCH, a coverage enhancement (CE) level, or a radio resource control (RRC) state.

In accordance with an embodiment, the method by the UE may further include monitoring a specific carrier selected based on a predefined priority among a plurality of carriers, based on the plural carriers configured to monitor the NPDCCH and the priority may be determined based on an index of each of the plural carriers, a maximum number of repetitive transmissions of the NPDCCH, or an operation performed by the UE before monitoring the NPDCCH.

In accordance with an embodiment, based on the one or more channels including the downlink shared channel, the downlink shared channel may include a narrowband physical downlink shared channel (NPDSCH), the carrier may include one or more carriers for receiving the NPDSCH by the UE, and the one or more carriers for receiving the NPDSCH may be differently configured based on at least one of content transmitted through the NPDSCH, a coverage enhancement (CE) level, a maximum number of repetitive transmissions of the NPDSCH, or a carrier for monitoring a narrowband physical downlink control channel (NPDCCH) scheduling the NPDSCH.

In accordance with an embodiment, the content transmitted through the NPDSCH may include at least one of system information, a broadcast channel, user data, or a media access control (MAC) control message.

In accordance with an embodiment, based on the one or more channels including the uplink shared channel, the uplink shared channel may include a narrowband physical uplink shared channel (NPUSCH), the carrier may include one or more carriers for transmitting the NPUSCH by the UE, and the one or more carriers for transmitting the NPUSCH may be differently configured based on at least one of content transmitted through the NPUSCH or a subcarrier spacing.

In accordance with an embodiment, the content transmitted through the NPUSCH may include at least one of acknowledgement/negative acknowledgement (ACK/NACK) information, a scheduling request message, user data, a media access control (MAC) control message, a radio resource control (RRC) message, or a higher layer message.

In accordance with an embodiment, the carrier for one or more channels may include a plurality of different carriers, carriers having the same system information among the plural different carriers may be configured as one group, and the system information of the carriers configured as one group may be simultaneously allocated.

In accordance with an embodiment, the system information may include at least one of information about an operation mode, information about an uplink/downlink configuration, or information about a time division duplex (TDD) special subframe configuration.

In accordance with an embodiment, the carrier may include a plurality of carriers and one or more carriers among the plural carriers are used to measure at least one of size of a downlink signal or quality of the downlink signal.

In accordance with an embodiment, based on different carriers for the downlink control channel, the downlink shared channel, and the uplink shared channel, the carriers used to measure at least one of the size of the downlink signal or the quality of the downlink signal may be configured as carriers for the uplink shared channel.

In accordance with an embodiment, the wireless communication system may include a wireless communication system supporting narrowband Internet of Things (NB-IoT).

Advantageous Effects

According to the present disclosure, wireless signal transmission and reception can be efficiently performed in a wireless communication system.

Effects obtainable from the present disclosure may be non-limited by the above mentioned effect. And, other unmentioned effects can be clearly understood from the following description by those having ordinary skill in the technical field to which the present disclosure pertains.

BEST MODE FOR CARRYING OUT THE DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
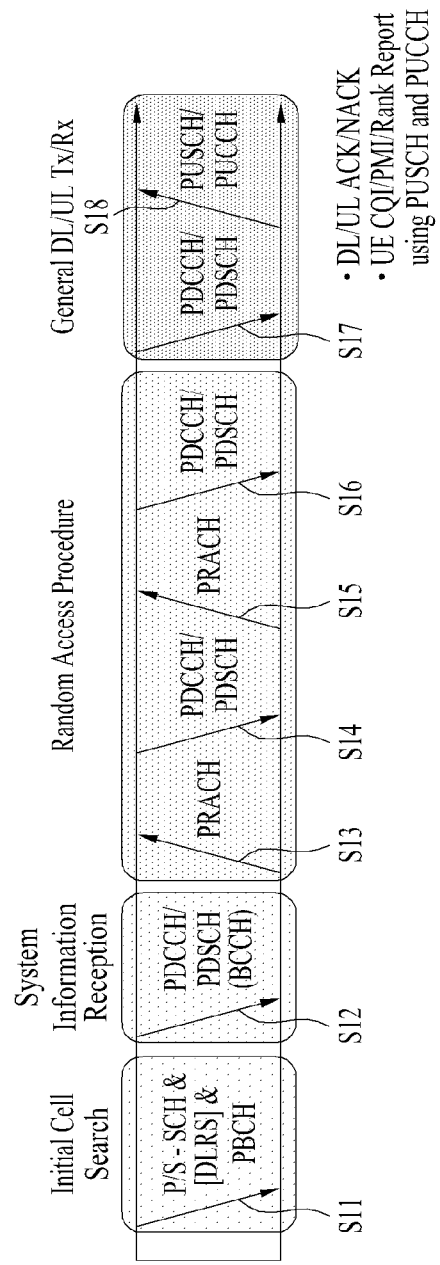
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
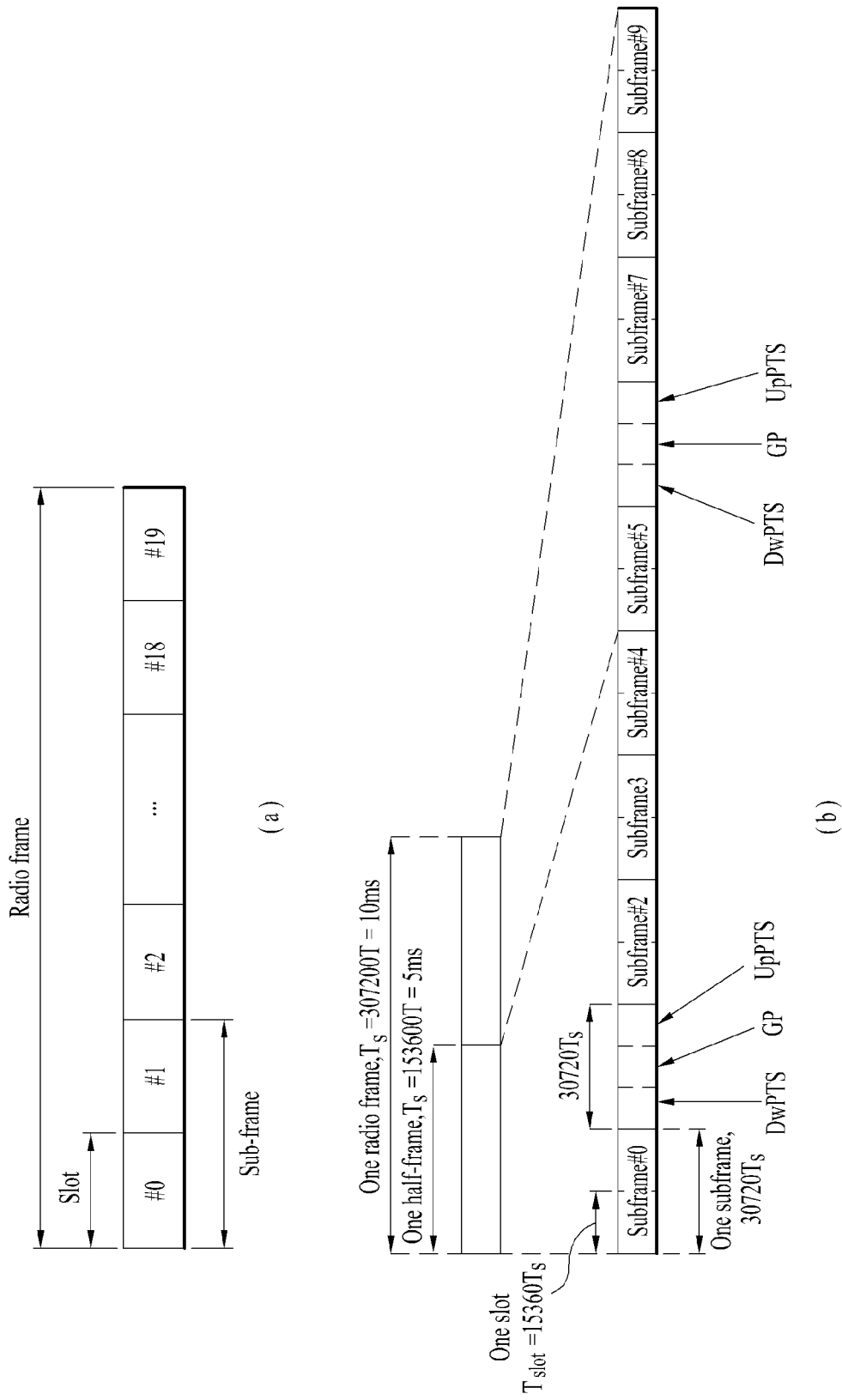
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 1 shows subframe configurations in a radio frame according to UL-DL configurations.

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
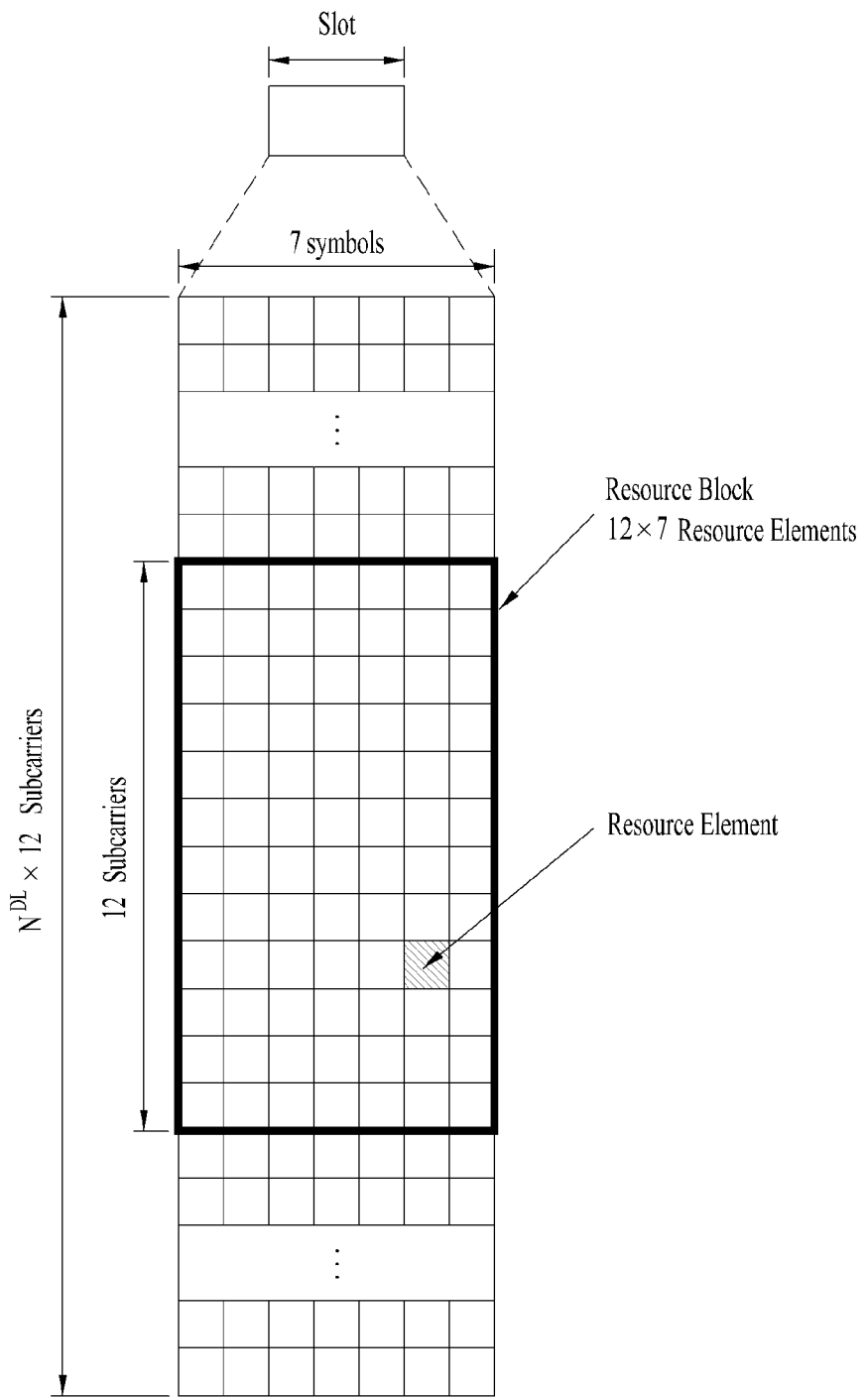
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
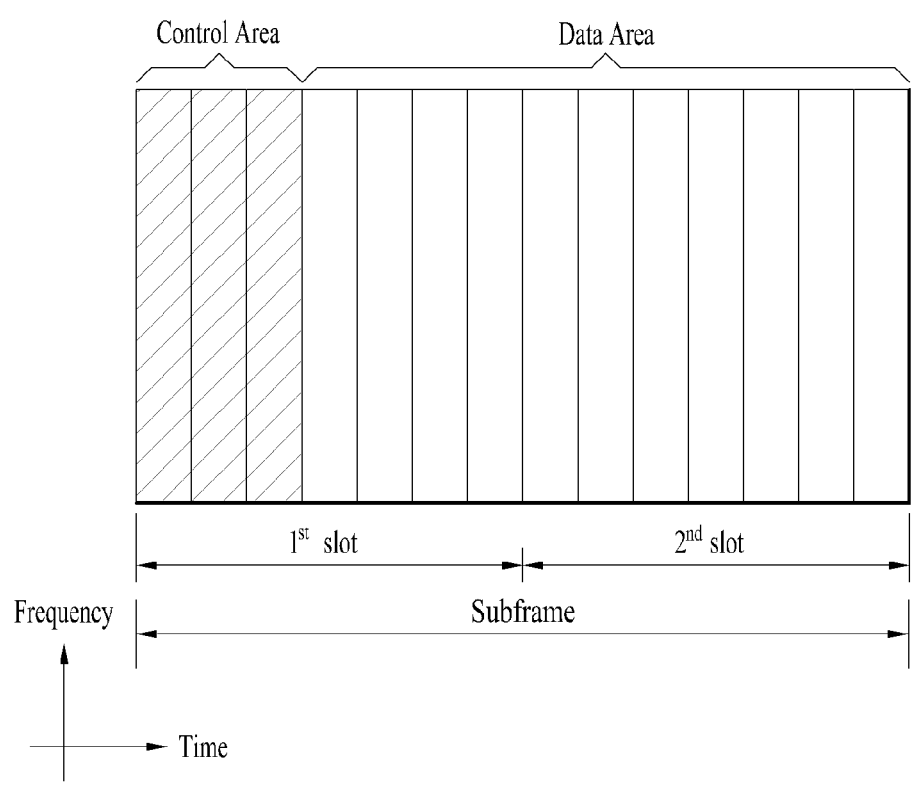
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DCI format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs(n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates a structure of an uplink subframe used in LTE(-A).

Figure 5:
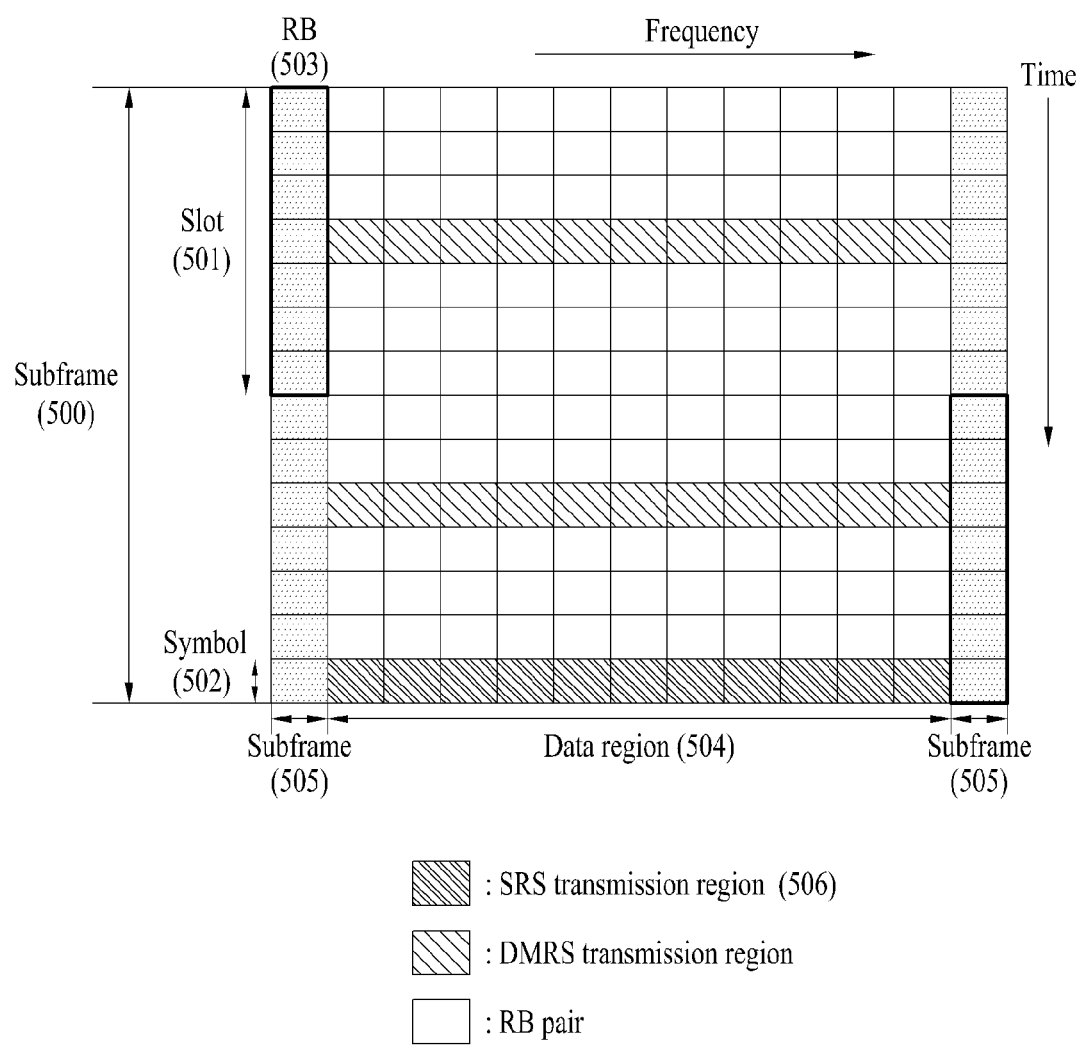
FIG. 5 illustrates the structure of an uplink subframe used in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

In next-generation RAT (Radio Access Technology), a self-contained subframe is considered in order to minimize data transmission latency.

Figure 6:
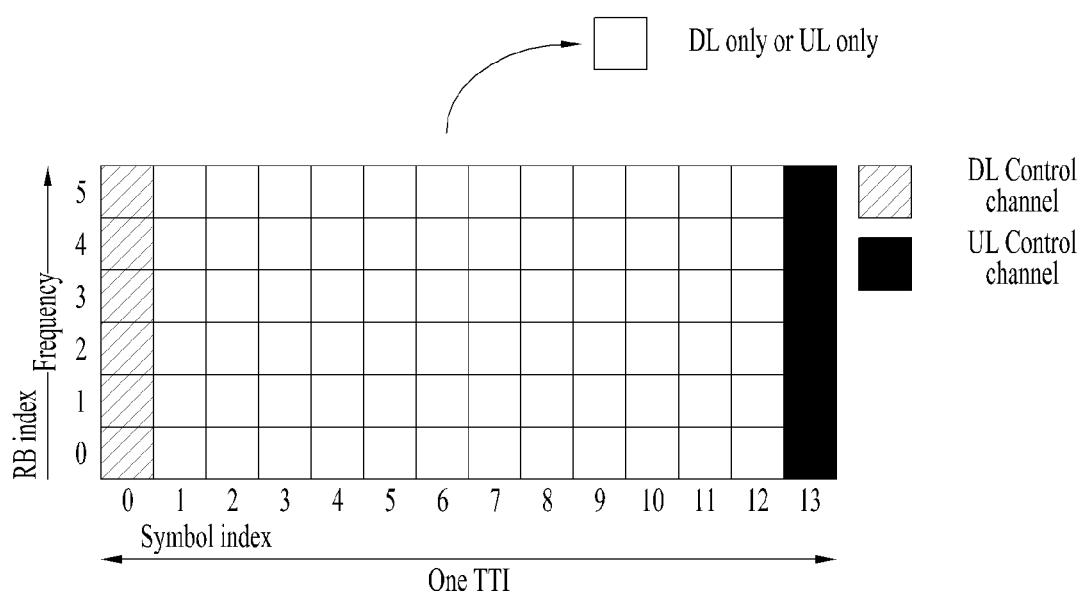
FIG. 6 illustrates the structure of a self-contained subframe.

FIG. 6 illustrates a self-contained subframe structure. In FIG. 15, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period
DL control period+DL data period
DL control period+GP+UL data period+UL control period
DL control period+GP+UL data period A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

In 3GPP New RAT (NR) system environment, it may be able to differently configure OFDM numerology (e.g., sub-carrier spacing and OFDM symbol duration based on the subcarrier spacing) among a plurality of cells carrier aggregated on a signal UE. Hence, (absolute time) duration of a time resource configured by the same number of symbols (e.g., an SF, a slot, or a TTI (for clarity, commonly referred to as TU (Time Unit)) can be differently configured between CA cells. In this case, a symbol can include an OFDM symbol and an SC-FDMA symbol.

Figure 7:
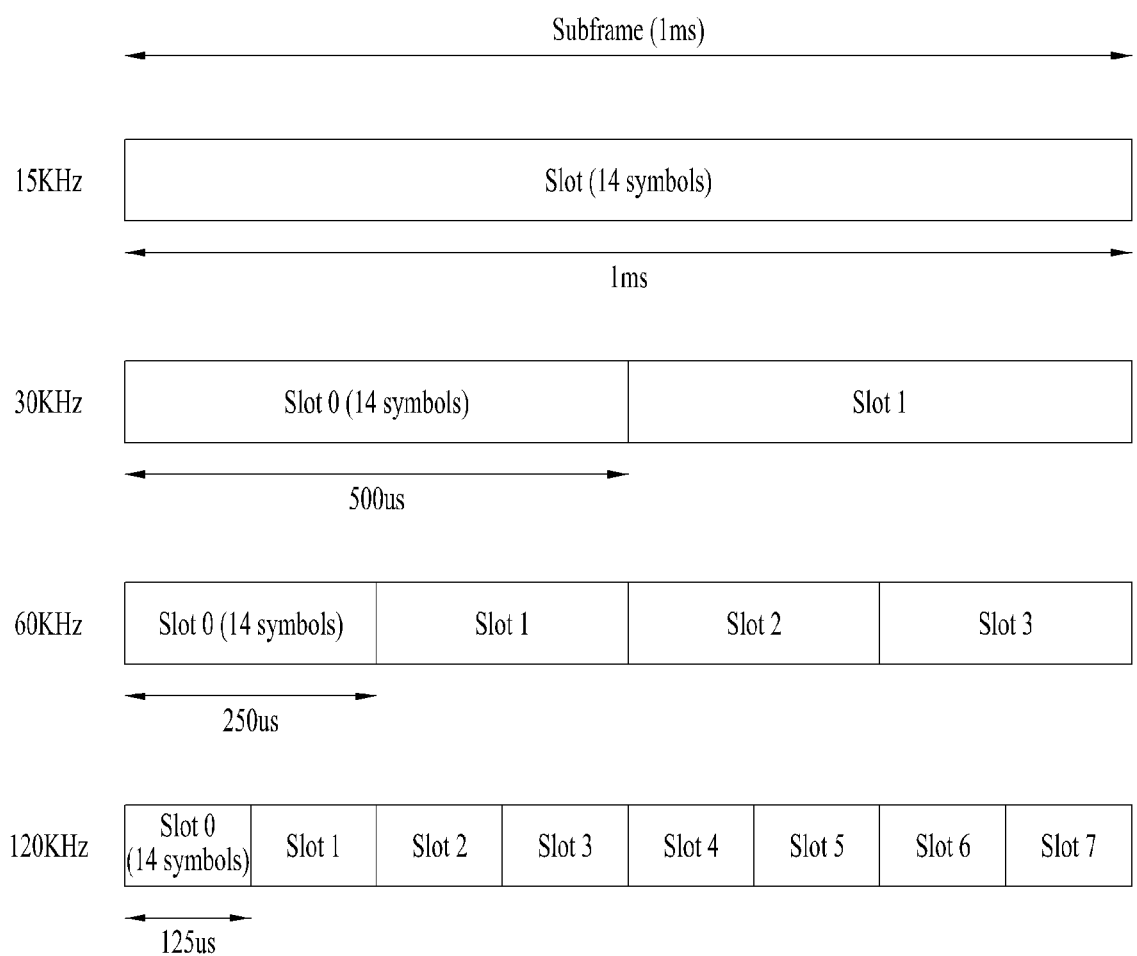
FIG. 7 illustrates a frame structure defined in 3GPP NR.

FIG. 7 illustrates a frame structure defined in 3GPP NR. Similar to a radio frame structure of LTE/LTE-A (refer to FIG. 2), in 3GPP NR, a radio frame includes 10 subframes and each of the subframes has a length of 1 ms. A subframe includes one or more slots and a slot length varies depending on an SCS. 3GPP NR supports SCS of 15 KHz, 30 KHz, 60 KHz, 120 KHz, and 240 KHz. In this case, a slot corresponds to a TTI shown in FIG. 6.

Table 4 illustrates a case that the number of symbols per slot, the number of slots per frame, and the number of slots per subframe vary according to an SCS.

TABLE 4

| SCS (15*2^u) | Number of symbols in slot | Number of slots in frame | Number of slots in subframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Hereinafter, narrowband Internet of Things (NB-IoT) will be described. For convenience, although a description will focus on NB-IoT based on the 3GPP LTE standard, the following description may be equally applied even to the 3GPP NR standard. To this end, modification may be made to interpretation of some technical configurations. For example, an LTE band may be interpreted as an NR band and a subframe may be interpreted as a slot.

NB-IoT supports three operation modes: in-band, guard-band, and stand-alone and the same requirements may be applied to each mode.

(1) In-band mode: allocate some of resources in an LTE band to NB-IoT.

(2) Guard-band mode: uses a guard frequency band of LTE and an NB-IoT carrier is deployed as closely as possible to an edge subcarrier of LTE.

(3) Stand-alone mode: allocate some carriers in a GSM band to NB-IoT.

An NB-IoT UE searches for an anchor carrier in a 100-kHz unit for initial synchronization and a center frequency of an anchor carrier in the in-band and the guard-band should be located within ±7.5 kHz from a channel raster of 100 kHz. In addition, 6 physical resource blocks (PRBs) among LTE PRBs are not assigned to NB-IoT. Therefore, the anchor carrier may be located only in a specific PRB.

Figure 8:
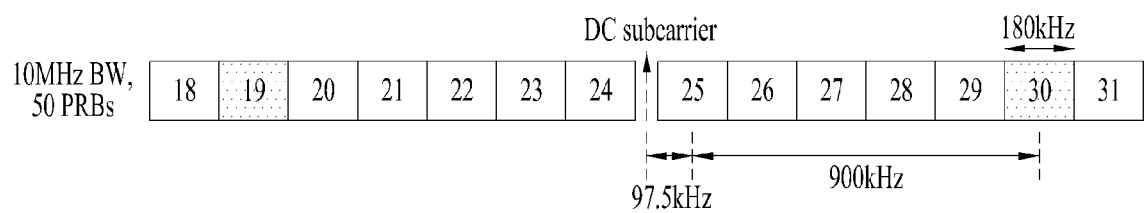
FIG. 8 illustrates deployment of an in-band anchor carrier in an LTE bandwidth of 10 MHz.

FIG. 8 illustrates deployment of an in-band anchor carrier in an LTE bandwidth of 10 MHz.

Referring to FIG. 8, a direct current (DC) subcarrier is located in a channel raster. Since a center frequency spacing between adjacent PRBs is 180 kHz, center frequencies of PRB indexes 4, 9, 14, 19, 30, 35, 40, and 45 are located at ±2.5 kHz from the channel raster. Similarly, a center frequency of a PRB suitable as an anchor carrier at an LTE bandwidth of 20 MHz is located at ±2.5 kHz from the channel raster and center frequencies of PRBs suitable as anchor carriers at LTE bandwidths of 3 MHz, 5 MHz, and 15 MHz are located at ±7.5 kHz from channel raster.

In the guard-band mode, a center frequency of a PRB immediately adjacent to an edge PRB of LTE at bandwidths of 10 MHz and 20 MHz is located at ±2.5 kHz from the channel raster. For bandwidths of 3 MHz, 5 MHz and 15 MHz, guard frequency bands corresponding to 3 subcarriers from the edge PRB may be used to position a center frequency of an anchor carrier at ±7.5 kHz from the channel raster.

The anchor carrier in the stand-alone mode is arranged at a channel raster of 100 kHz and all GSM carriers, including a DC carrier, may be used as NB-IoT anchor carriers.

NB-IoT supports multiple carriers and a combination of in-band+in-band, in-band+guard-band, guard band+guard-band, or stand-alone+stand-alone may be used.

NB-IoT DL uses an OFDMA scheme having a subcarrier spacing of 15 kHz. This provides orthogonality between subcarriers to facilitate coexistence with an LTE system.

NB-IoT DL is provided with physical channels such as a narrowband physical broadcast channel (NPBCH), a narrowband physical downlink shared channel (NPDSCH), and a narrowband physical downlink control channel (NPDCCH) and is provided with physical signals such as a narrowband primary synchronization signal (NPSS), a narrowband primary synchronization signal (NSSS), and a narrowband reference signal (NRS).

The NPBCH delivers a master information block-narrowband (MIB-NB), which is minimum system information necessary for the NB-IoT UE to access a system, to the UE. An NPBCH signal may be transmitted a total of 8 times to improve coverage. A transport block size (TBS) of the MIB-NB is 34 bits and is newly updated at a TTI period of every 640 ms. The MIB-NB includes information such as an operation mode, a system frame number (SFN), a hyper-SFN, the number of cell-specific reference signal (CRS) ports, a channel raster offset, etc.

The NPSS consists of a Zadoff-Chu (ZC) sequence having a length of 11 and a root index of 5. The NPSS may be generated according to the following equation.

$$d_l(n) = S(l) \cdot e^{-j\frac{\pi u n(n+1)}{11}}, n = 0, 1, \ldots, 10 \quad \text{[Equation 1]}$$

Here, S(1) for an OFDM symbol index 1 may be defined as shown in Table 5.

TABLE 5

| Cyclic prefix length | S(3), ..., S(13) |
|---|---|
| Normal | 1  1  1  1  −1  −1  1  1  1  −1  1 |

The NSSS consists of a combination of a ZC sequence having a length of 131 and a binary scrambling sequence such as a Hadamard sequence. The NSSS indicates a physical cell ID (PCID) through the combination of the above sequences to NB-IoT UEs in a cell.

The NSSS may be generated according to the following equation.

$$d(n) = b_q(m) e^{-j2\pi\theta_f n} e^{-j\frac{\pi u n'(n'+1)}{131}} \quad \text{[Equation 2]}$$

Here, variables applied to Equation 2 may be defined as follows.

$$n = 0, 1, \ldots, 131 \quad \text{[Equation 3]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

Here, a binary sequence $b_q$ (m) is defined as shown in Table 6 and $b_0$(m) to $b_3$(m) correspond to columns 1, 32, 64, and 128 of a Hadamard matrix of order 128, respectively. A cyclic shift $\theta_f$ for a frame number $n_f$ may be defined as indicated in Equation 4.

TABLE 6

| q | $b_q$(0), ... $b_q$(127) |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 1 −1 −1 1 −1 1 1 −1] |
| 2 | [1 −1 −1 1 −1 1 1 −1 −1 1 1 −1 1 −1 −1 1 1 −1 −1 1 −1 1 1 −1 1 −1 −1 1 1 −1 −1 1 1 −1 −1 1 −1 1 1 −1 −1 1 1 −1 1 −1 −1 1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 1 −1 −1 1 −1 1 1 −1 −1 1 1 −1 1 −1 −1 1]] |

TABLE 6-continued

| q | $b_q(0), \ldots b_q(127)$ |
|---|---|
| 3 | [1 −1 −1 1 −1 1 1 −1 −1 1 1 −1 1 −1 −1 1 −1 1 1 −1<br>1 −1 −1 1 1 −1 −1 1 1 −1 1 1 −1 −1 1 1 −1 1 −1 −1 1 1<br>1 −1 −1 1 −1 1 1 −1 1 −1 −1 1 1 −1 1 1 −1 −1 1 1 −1<br>1 −1 −1 1 −1 1 1 −1 1 −1 −1 1 1 −1 1 1 −1 −1 1 1 1<br>1 −1 −1 1 −1 1 1 −1 −1 1 1 −1 1 1 −1 −1 1 1 1 −1 −1 1 1<br>−1 1 1 −1 −1 1 1 −1 1 −1 −1 1 1 −1 1 1 −1 1 −1 −1 1 1<br>1 −1 −1 1 1 −1 1 1 −1] |

$$\theta_f = \frac{33}{132}(n_f/2)\bmod 4 \qquad \text{[Equation 4]}$$

Here, $n_f$ denotes a radio frame number and mod denotes a modulo function.

The NRS is provided as a reference signal for channel estimation required for DL physical channel demodulation and is generated in the same manner as in LTE. However, a narrowband-physical cell ID (NB-PCID) (or an NCell ID or an NB-IoT BS ID) is used as an initial value for initialization. The NRS is transmitted through one or two antenna ports (p=2000 or 2001).

The NPDCCH has the same transmit antenna configuration as the NPBCH and carries DCI. The NPDCCH supports three DCI formats. DCI format N0 includes narrowband physical uplink shared channel (NPUSCH) scheduling information and DCI formats N1 and N2 include NPDSCH scheduling information. The NPDCCH may perform a maximum of 2048 repetitive transmissions to improve coverage.

The NPDSCH is used to transmit data (e.g., transport block (TB)) of a transport channel such as a DL-shared channel (DL-SCH) and a paging channel (PCH). A maximum TBS is 680 bits and the NPDSCH may perform a maximum of 2048 repetitive transmissions to improve coverage.

Figure 9:
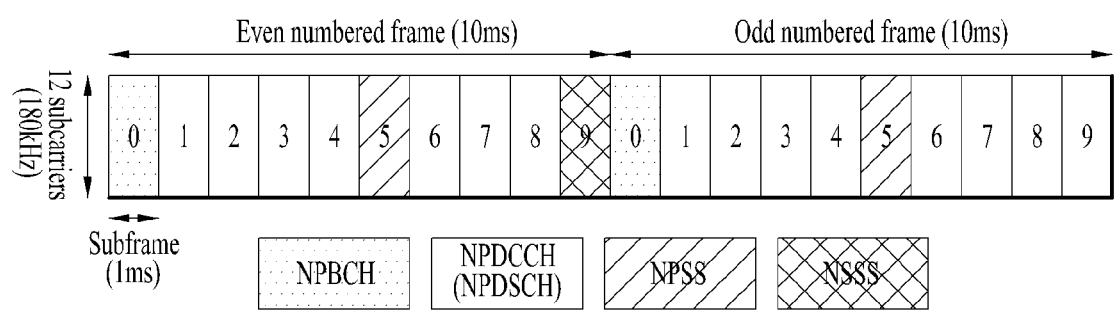
FIG. 9 illustrates locations at which NB-IoT DL physical channels/signals are transmitted in an FDD LTE system.

FIG. 9 illustrates locations at which NB-IoT DL physical channels/signals are transmitted in an FDD LTE system.

Referring to FIG. 9, an NPBCH is transmitted in the first subframe of every frame, an NPSS is the sixth subframe of every frame, and an NSSS is transmitted in the last (e.g., 10th) subframe of every even frame. An NB-IoT UE acquires frequency, symbol, and frame synchronization using synchronization signals (NPSS and NSSS) and searches for 504 physical cell IDs (i.e., BS IDs). An LTE synchronization signal is transmitted through 6 PRBs and an NB-IoT synchronization signal is transmitted through one PRB.

In NB-IoT, a UL physical channel consists of a narrowband physical random access channel (NPRACH) and an NPUSCH and supports single-tone transmission and multi-tone transmission. Single-tone transmission is supported for subcarrier spacings of 3.5 kHz and 15 kHz and multi-tone transmission is supported only for a subcarrier spacing of 15 kHz. On UL, the subcarrier spacing of 15 kHz may maintain orthogonality with LTE to provide optimal performance, whereas the subcarrier spacing of 3.75 kHz may lower orthogonality so that performance deterioration may occur due to interference.

An NPRACH preamble consists of 4 symbol groups and each symbol group consists of a CP and 5 (SC-FDMA) symbols. The NPRACH supports only single-tone transmission with a subcarrier spacing of 3.75 kHz and provides CPs of lengths of 66.7 µs and 266.67 µs to support different cell radii. Each symbol group performs frequency hopping and a hopping pattern thereof is as follows. A subcarrier transmitting the first symbol group is determined in a pseudo-random manner. The second symbol group performs 1-sub-carrier hopping, the third symbol group performs 6-subcarrier hopping, and the fourth symbol group performs 1-subcarrier hopping. In the case of repetitive transmission, a frequency hopping procedure is repeatedly applied and the NPRACH preamble may be repeatedly transmitted up to 128 times to improve coverage.

The NPUSCH supports two formats. NPUSCH format 1 is used for UL-SCH transmission and a maximum TBS is 1000 bits. NPUSCH format 2 is used for UL control information transmission such as HARQ ACK signaling. NPUSCH format 1 supports single-/multi-tone transmission and NPUSCH format 2 supports only single-tone transmission. In the case of single-tone transmission, pi/2-binary phase shift keying (BPSK) and pi/4-quadrature phase shift keying (QPSK) are used to reduce a peak-to-average power ratio (PAPR).

In the stand-alone and guard-band modes, all resources included in one PRB may be allocated to NB-IoT. However, in the case of the in-band mode, resource mapping is restricted for coexistence with a legacy LTE signal. For example, in the in-band mode, resources classified as an LTE control channel allocation area (OFDM symbols 0 to 2 of every subframe) may not be allocated to the NPSS/NSSS and an NPSS/NSSS symbol mapped to an LTE CRS RE is punctured.

Figure 10:
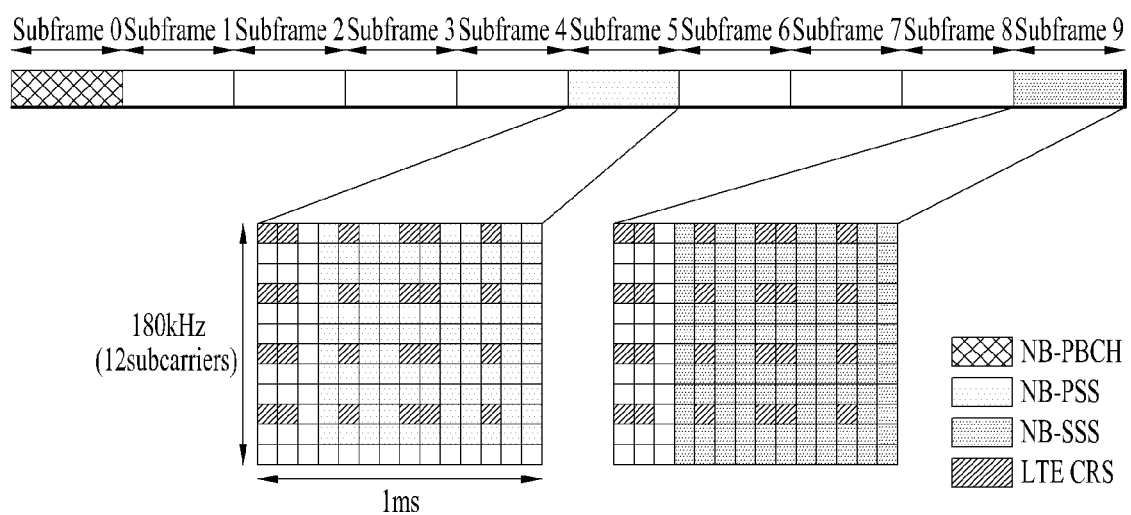
FIG. 10 illustrates resource allocation of an NB-IoT signal and an LTE signal in an in-band mode.

FIG. 10 illustrates resource allocation of an NB-IoT signal and an LTE signal in an in-band mode. Referring to FIG. 10, for ease of implementation, an NPSS and an NSSS are not transmitted in OFDM symbols corresponding to a control region of an LTE system (e.g., the first three OFDM symbols in a subframe) regardless of an operation mode. In addition, an NPSS/NSS RE colliding with an LTE CRS RE on a physical resource is punctured and mapped so as not to affect the LTE system.

After cell search, the NB-IoT UE demodulates an NPBCH in a situation in which system information other than a PCID is absent. Therefore, an NPBCH symbol may not be mapped to the LTE control channel allocation region. In the absence of the system information, since the NB-IoT UE assumes 4 LTE antenna ports (e.g., p=0, 1, 2, and 3) and two NB-IoT antenna ports (e.g., p=2000 and 2001), the NPBCH may not be allocated to an CRS RE and an NRS RE. Therefore, the NPBCH is rate-matched to given available resources.

After NPBCH demodulation, the NB-IoT UE obtains information about the number of CRS antenna ports. However, the NB-IoT UE is not still aware of information about the LTE control channel allocation region. Accordingly, the NPDSCH that transmits system information block type 1 (SIB1) data is not mapped to a resource classified as the LTE control channel allocation region.

However, unlike the NPBCH, an RE that is not actually allocated to an LTE CRS may be allocated to the NPDSCH. After receiving SIB1, since the NB-IoT UE acquires all information related to resource mapping, a BS may map the NPDSCH (except when transmitting SIB1) and the NPDCCH to available resources based on LTE control channel information and the number of CRS antenna ports.

Figure 11:
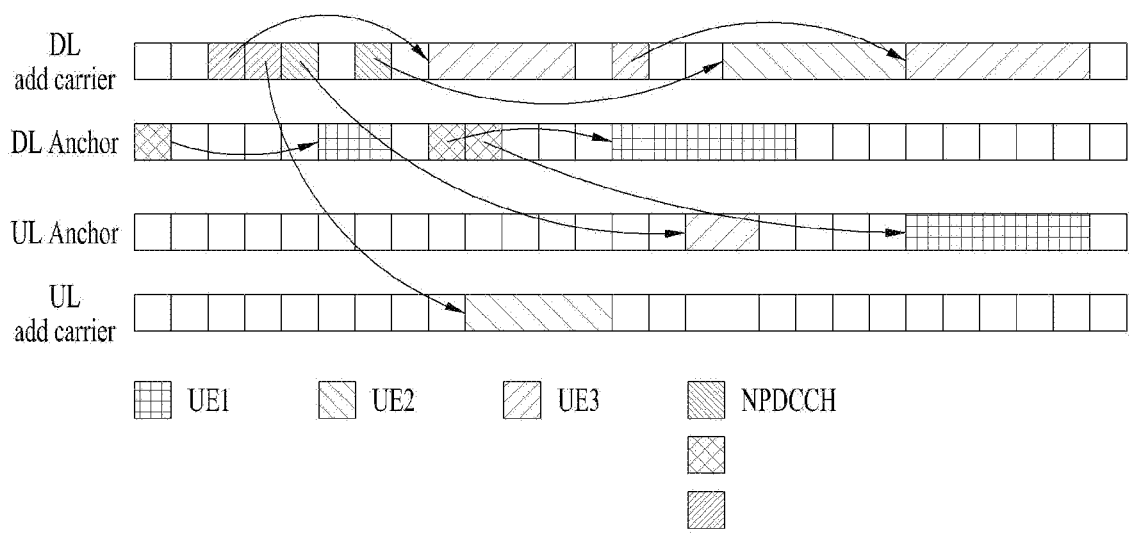
FIG. 11 illustrates the operation of an anchor carrier and a non-anchor carrier in an NB-IoT system.

FIG. 11 illustrates the operation of an anchor carrier and a non-anchor carrier in an NB-IoT system.

Referring to FIG. 11, each of UE1, UE2, and UE3 may operate in anchor carriers for both DL and UL, in non-anchor carriers for both DL and UL, or in a non-anchor carrier only for DL. For example, UE1 may operate in anchor carriers for both DL and UL and UE2 may operate non-anchor carriers for both DL and UL. UE3 may operate in a non-anchor carrier for DL and an anchor carrier for UL. Particularly, referring to the operation of UE2 in the non-anchor carriers illustrated in FIG. 11, since DL and UL may not coexist in a specific frequency in an FDD system, a DL non-anchor carrier and a UL non-anchor carrier are separately allocated. In contrast, in a TDD system, DL and UL may be configured as the same non-anchor carrier.

Embodiment: Cross Scheduling for NB-IoT

The present disclosure proposes a cross scheduling method capable of being effectively applied to a system that allows many repetitive transmissions, such as an NB-IoT system. However, the present disclosure is not limited to the NB-IoT system and may be similarly applied to a system supporting many repetitive transmissions, such as an enhanced machine-type communication (eMTC) system, and to other general systems. However, hereinafter, a description will be given based on NB-IoT Release 13 and Release 14 systems for convenience. Although the present disclosure may be effectively applied to the case in which the amount of DL resources and the amount of UL resources are different according to a UL-DL configuration, as in the TDD system, the present disclosure may be used even in other duplex mode systems when DL and UL resources are not sufficient to perform repetitive transmission.

In the TDD system, the number of DL subframes and the number of UL subframes may vary according to the UL-DL configuration as shown in Table 1. In particular, except for channels (e.g., an NPSS, an NSSS, an NPBCH, system information block 1-NB (SIB1-NB), and other SIBs) that the BS should basically transmit always or periodically, the number of DL subframes for scheduling an NPDCCH and an NPDSCH may be insufficient. In addition, even in the case of UL, it may be difficult to secure a sufficient number of UL subframes to schedule both NPUSCH formats 1 and 2.

To solve the above-described problems, a method of transmitting a broadcasting channel, the NPDCCH, and the NPDSCH in different subcarriers may be considered. For example, the broadcasting channel may include, but is not limited to, the NPSS, NSSS, NPBCH, SIB1-NB, and other SIBs. A method of transmitting NPUSCH format 1, format 2, and an NPRACH in different subcarriers may also be considered. In particular, in a system that allows many repetitive transmissions, such as the NB-IoT system, resources may be more effectively used by transmitting channels that the UE does not need to simultaneously receive at a specific timing in different subcarriers.

In a cross-carrier scheduling method proposed by the present disclosure, an NPDCCH monitoring carrier, an NPDSCH scheduling carrier, and an NPUSCH scheduling carrier may be differently configured. In this case, the NPDCCH monitoring carrier may mean a carrier in which the UE monitors the NPDCCH. The NPDSCH scheduling carrier may mean a carrier in which the NPDSCH may be scheduled or the NPDSCH is scheduled through the NPDCCH. The NPUSCH scheduling carrier may represent a carrier in which the NPUSCH may be scheduled or the NPUSCH is scheduled through the NPDCCH. In the present disclosure, cross-carrier scheduling is not applied only to non-anchor carriers and may be applied to anchor carriers and non-anchor carriers without being distinguished therebetween.

1. Method of Configuring Non-Anchor Carrier for Cross-Carrier Scheduling

The present disclosure proposes a method of configuring a non-anchor carrier for cross-carrier scheduling. Hereinafter, although the non-anchor carrier and the anchor carrier will be described by distinguishing therebetween for convenience of description, the non-anchor carrier may include the anchor carrier.

[Method #1 Non-Anchor Carrier for Monitoring NPDCCH]

The UE may be configured with one or more non-anchor carriers for monitoring the NPDCCH. In this case, the UE may be configured with a different non-anchor carrier according to a search space (e.g., Type1 common search space (CSS), Type1A CSS, Type2 CSS, Type2A CSS, or a user-specific search space (USS)) or a coverage enhancement (CE) level. For example, the UE may be configured with a different non-anchor carrier according to the CE level and may monitor a different non-anchor carrier according to which search space the UE monitors at a specific timing. In addition, the UE may be configured with a different non-anchor carrier according to a radio resource control (RRC) state. Accordingly, the UE may monitor a different non-anchor carrier according to the CE level or the RRC state. In this case, monitoring the non-anchor carrier may mean attempting to blind-decode the NPDCCH.

When different non-anchor carriers for monitoring the NPDCCH are configured, a different maximum number of repetitive transmissions, Rmax, may be configured per non-anchor carrier.

[Method #2 Case in which Number of Non-Anchor Carriers for Monitoring NPDCCH at Specific Timing is 2 or More]

As two or more non-anchor carriers are configured to monitor the NPDCCH, when there are two or more non-anchor carriers to be monitored at a specific time point, the UE may selectively monitor a specific non-anchor carrier according to a preset priority.

The priority may be determined according to a monitoring target, a monitoring purpose, or a search space. The UE may selectively monitor a non-anchor carrier having a high priority. For example, a priority may be determined according to the index of a non-anchor carrier. The priority may be determined according to an operation that has been performed by the UE before monitoring the NPDCCH. For example, the UE may perform an NPDCCH ordered NPRACH procedure, transmit NPUSCH format 1, transmit NPUSCH format 2, or receive the NPDSCH, before monitoring the NPDCCH. In this case, according to the operation performed before monitoring the NPDCCH, non-anchor carriers in which the UE needs to monitor the NPDCCH may be different. The priority may also be determined according to the maximum number of repetitive transmissions, Rmax, for each non-anchor carrier. For example, the maximum number of repetitive transmissions, Rmax, of the NPDCCH may be different for each non-anchor carrier. The UE may monitor the NPDCCH starting from a non-anchor carrier having a small Rmax value or monitor the NPDCCH starting from a non-anchor carrier having a large Rmax value.

In addition, when NPDCCH monitoring durations of two or more non-anchor carriers partially overlap in time, the UE may preferentially monitor a non-anchor carrier that is advanced in time.

[Method #3 Non-Anchor Carrier for Receiving NPDSCH]

The UE may be configured with one or more non-anchor carriers (e.g., NPDSCH scheduling carriers) for receiving the NPDSCH. However, according to an embodiment, the NPDSCH scheduling carrier may also be referred to as an NPDSCH scheduled carrier.

When the UE is configured with one or more non-anchor carriers for receiving the NPDSCH, a different non-anchor carrier may be configured according to content transmitted through the NPDSCH. In this case, the content may be defined by distinguishing SIB1-NB and other SIBs or by distinguishing a BCCH of a higher layer. The content may also be defined by distinguishing user data, a MAC control message, and other higher-layer messages. For example, a carrier in which the NPDSCH carrying a BCCH is transmitted and a carrier in which the NPDSCH carrying the BCCH is not transmitted may be differently configured. However, according to an embodiment, the same non-anchor carrier may be configured without distinguishing the content transmitted through the NPDSCH and only some non-anchor carriers may be configured to overlap.

In addition, the maximum number of repetitive transmissions of the NPDSCH may differ according to each non-anchor carrier and the NPDSCH scheduling carrier may be differently configured according to the maximum number of repetitive transmissions of the NPDSCH. In addition, a different carrier may be configured according to a CE level. A specific NPDSCH scheduling carrier set may be limitedly configured according to each CE level. In this case, the NPDSCH scheduling carrier set may also be referred to as an NPDSCH scheduled carrier set according to an embodiment.

The NPDSCH scheduling carrier may be different according to the NPDCCH monitoring carrier for scheduling the NPDSCH.

In addition, when NPDSCH scheduling information is transmitted through the NPDCCH, a field for indicating the NPDSCH scheduling carrier may be indicated only within a specific set according to the content transmitted through the NPDSCH. Accordingly, the size of a DCI field of the NPDCCH may be reduced.

The NPDSCH scheduling carrier set may differ according to the NPDCCH monitoring carrier that schedules the NPDSCH. For example, the NPDCCH monitoring carrier and the NPDSCH scheduling carrier may always be the same. In addition to the above-described case, the NPDSCH scheduling carrier may be differently configured in various ways.

[Method #4 Non-Anchor Carrier for Transmitting NPUSCH]

The UE may be configured with one or more non-anchor carriers (e.g., NPUSCH scheduling carriers) for transmitting the NPUSCH. However, according to an embodiment, the NPUSCH scheduling carrier may also be referred to as an NPUSCH scheduled carrier.

There may be one or more NPUSCH scheduling carriers and different non-anchor carriers may be configured according to content transmitted through the NPUSCH. In addition, a non-anchor carrier for transmitting NPUSCH format 2 may be the same as the NPDSCH scheduling carrier corresponding to NPUSCH format 2 or as the NPDCCH monitoring carrier that has scheduled the corresponding NPDSCH. NPUSCH format 2 is used to transmit ACK/NACK for the NPDSCH received from the BS. A carrier for transmitting NPUSCH format 2 may be equal to or may have a specific relationship with the NPDSCH scheduling carrier corresponding to ACK/NACK transmitted through NPUSCH format 2 and may be equal to or may have a specific relationship with the NPDCCH monitoring carrier that has scheduled the NPDSCH.

When an importance level of the content transmitted through the NPUSCH is high, generally, a more stable default carrier than the non-anchor carrier is configured and the NPUSCH scheduling carrier may be indicated by the default carrier. For example, the default carrier may include an anchor carrier, a carrier having the highest received signal received power (RSRP), or a carrier that has performed random access. According to an embodiment, the anchor carrier may always be configured as the default carrier. For example, since ACK/NACK transmitted through NPUSCH format 2 is information of a relatively high importance level, a carrier for transmitting NPUSCH format 2 may always be configured as the anchor carrier.

In addition, when operation modes in a plurality of configured carriers or in a plurality of activated multi-carriers are different, there may be no legacy impact according to an operation mode and thus NPUSCH reception performance may differ. Therefore, according to an embodiment, a carrier for transmitting NPUSCH format 2 may be limited to a specific carrier by first considering the operation mode.

A carrier for transmitting a single-tone NPUSCH and a carrier for transmitting a multi-tone NPUSCH may be configured as different non-anchor carrier sets and NPUSCHs having different subcarrier spacings may be configured as different non-anchor carriers.

In addition, when the NPDCCH monitoring carrier and the NPUSCH scheduling carrier are the same, there is no frequency retuning time unlike a legacy FDD system. Therefore, NPUSCH scheduling delay information indicated by DCI (e.g., DCI format N0) including UL grant information may be defined and interpreted in a manner different from that of the legacy FDD system. For example, when the NPDCCH monitoring carrier and the NPUSCH scheduling carrier are the same, since frequency retuning time is unnecessary, a minimum value of NPUSCH scheduling delay may be defined or interpreted to have a smaller value than that of the FDD system.

When the NPDSCH scheduling carrier and the carrier for transmitting NPUSCH format 2 for reporting ACK/NACK are the same, delay information k0 of a HARQ-ACK resource indicated by DCI (e.g., DCI format N1) including DL grant information may be differently defined or interpreted from that of the legacy FDD system. For example, if the NPDSCH scheduling carrier and the carrier for transmitting NPUSCH format 2 for reporting ACK/NACK are the same, a minimum value of delay of the HARQ-ACK resource may be defined or interpreted to have a smaller value than that of the legacy FDD system.

2. Scheduling and Operation Method Through Cross-Carrier Scheduling

Hereinafter, a method of performing scheduling by the BS using a combination of the above-proposed various carriers will be proposed. In this case, scheduling may include self-carrier scheduling or cross-carrier scheduling. Hereinafter, although scheduling is referred to as cross-carrier scheduling for convenience of description, scheduling may be interpreted as including self-carrier scheduling. In some embodiments, cross-carrier scheduling may be referred to as cross-RB scheduling by replacing a carrier with an RB.

[Method #5 Configuration of Multiple Non-Anchor Carriers]

According to an embodiment, the BS may be configured with multiple non-anchor carriers. In this case, the multiple configured non-anchor carriers may be referred to as a non-anchor carrier set for cross-carrier scheduling and the non-anchor carrier set may be cell-commonly or UE-specifically configured. For example, various combinations of the NPCCH monitoring carrier, the NPDSCH scheduling carrier, and the NPUSCH scheduling carrier may be cell-commonly configured or may be UE-specifically configured based on the cell-common configuration. In addition, the NPDCCH, the NPDSCH, and the NPUSCH may be independently configured.

In the TDD system, a DL non-anchor carrier and a UL non-anchor carrier may be simultaneously configured as the same non-anchor carrier through one non-anchor carrier configuration. Alternatively, a specific non-anchor carrier may be configured to be used only as the DL non-anchor carrier. Particularly, when the number of UL subframes is smaller than the number of DL subframes according to a TDD UL/DL configuration, a DL carrier and a UL carrier may be indicated by different carriers and, in this case, the carriers may include both the anchor carrier and the non-anchor carrier.

[Method #6 NPDSCH Related Scheduling (DL Grant—NPDSCH—NPUSCH Format 2]

The BS may transmit a DL grant including NPDSCH scheduling information to the UE. The UE may receive the NPDSCH based on the received DL grant. After receiving the NPDSCH, the UE may transmit ACK/NACK for the received NPDCH through NPUSCH format 2.

The DL grant is transmitted through the NPDCCH and may include information indicating the NPDSCH scheduling carrier in a preset carrier set. The information indicating the NPDSCH scheduling carrier may mean information indicating a carrier scheduled to transmit the NPDSCH. According to an embodiment, the information may also be referred to as an indicator for the NPDSCH scheduling carrier. In this case, the indicator for the NPDSCH scheduling carrier may have a concept similar to a carrier indicator field (CIF) of the LTE system.

For example, together with information about the NPDSCH scheduling carrier and the NPUSCH scheduling carrier, information about a time difference between the channels may be explicitly indicated through the DCI. However, in this case, the size of a DCI payload may increase. Therefore, as a method of reducing the size of the DCI payload, an implicit scheduling method may be needed. For example, there may be a method of implicitly indicating the NPDSCH scheduling carrier and the NPUSCH scheduling carrier using the information about the relative time difference or, conversely, a method of indicating the relative time difference between the channels by indicating only information of the NPDSCH scheduling carrier and the NPUSCH scheduling carrier. In this case, the information indicating the NPDSCH scheduling carrier may be implicitly mapped according to the relative position or absolute position of an NPDSCH starting subframe, a repetition number of the NPDSCH, or a HARQ process number. However, when there are two or more NPDSCH scheduling carriers that may be implicitly mapped, the NPDSCH scheduling carriers may be explicitly distinguished and indicated by the DCI.

The NPDSCH/NPUSCH scheduling carrier may be implicitly indicated according to the repetition number of each channel or the HARQ process number. According to an embodiment, NPUSCH format 2 may always be indicated by a default carrier (e.g., a carrier indicated through RRC, an anchor carrier, or the same carrier as the NPDCCH monitoring carrier) without additional carrier information.

In addition, the NPDCCH monitoring carrier may indicate the NPDSCH scheduling carrier and the NPUSCH scheduling carrier for reporting ACK/NACK as different carriers.

One DL HARQ process may be configured through one NPDCCH monitoring carrier to be repeatedly transmitted in a plurality of NPDSCH scheduling carriers in the form of time division multiplex (TDM). In this case, one NPDCCH monitoring carrier may indicate one DL HARQ process as a plurality of NPDSCH scheduling carriers. In addition, one PDCCH monitoring carrier may indicate a plurality of DL HARQ processes by distributing the DL HARQ processes to different NPDSCH scheduling carriers.

The BS may configure a carrier for transmitting NPUSCH format 2 as a specific carrier in order to report ACK/NACK for the NPDSCH. For example, ACK/NACK for the NPDSCH may be transmitted through a scheduled NPDSCH carrier, a carrier in which a corresponding DL grant has been transmitted, a default carrier (e.g., an anchor carrier or a stable carrier such as an LTE PCell), a carrier mapped to a start subframe in which NPUSCH format 2 is transmitted, a carrier corresponding to a repetition number of NPUSCH format 2, or a carrier corresponding to a subcarrier index of NPUSCH format 2. When transmitting the NPUSCH or NPUSCH format 1 most recently before transmitting NPUSCH format 2 or before receiving the DL grant corresponding to NPSCH format 2, ACK/NACK for the NPDSCH may be combined with a UL carrier index in which ACK/NACK for the transmitted NPUSCH or NPUSCH format 1 has been transmitted and may be transmitted through a mapped carrier.

When the number of DL subframes available for NB-IoT is greater than the number of UL subframes by a predetermined ratio (e.g., in the case of DL heavy), the NPUSCH scheduling carrier may be indicated by another carrier according to a specific equation. Alternatively, when the number of UL subframes does not satisfy a specific condition, ACK/NACK signals for two or more NPDSCHs may be bundled and transmitted in one specific carrier.

As described above, one NPDCCH monitoring carrier may indicate one DL HARQ process as a plurality of NPDSCH scheduling carriers and indicate a plurality of DL HARQ processes as different NPDSCH scheduling carriers. The above-described method may be equally applied even to a UL HARQ process. For example, the NPDCCH monitoring carrier may indicate one UL HARQ process as a plurality of NPUSCH scheduling carriers and indicate a plurality of UL HARQ processes as different NPUSCH scheduling carriers.

When carriers are differently configured, scheduling delay information of DCI may be differently interpreted. For example, a scheduling delay value may be interpreted as a value larger by a specific value in consideration of a DL/UL switching time and an RF retuning time. In this case, the scheduling delay is a time gap of NPDCCH-NPDSCH, NPDCCH-NPUSCH f/1, or NPDSCH-NPUSCH f/2 and may be indicated through the DCI.

[Method #7 NPUSCH Related Scheduling (UL Grant—NPUSCH Format 1—NPDCCH Monitoring)]

The BS may transmit a UL grant including NPUSCH scheduling information to the UE. The UE may transmit the NPUSCH to the BS based on the received UL grant. After transmitting the NPUSCH, the UE may receive ACK/NACK information for the transmitted NPUSCH from the BS.

The UL grant is transmitted through an NPDCCH (e.g., DCI format N0) and may include information indicating a carrier for transmitting NPUSCH format 1 in a configured NPUSCH scheduling carrier set. The information indicating the carrier for transmitting NPUSCH format 1 may mean information indicating a carrier scheduled to transmit NPUSCH format 1. According to an embodiment, the information may be referred to as an indicator for the NPUSCH scheduling carrier. In this case, the indicator for the NPUSCH scheduled carrier may be a concept similar to the CIF in the LTE system.

In this case, the indicator for the NPUSCH scheduling carrier may be implicitly mapped according to a relative position or absolute position of a starting subframe in which the NPUSCH is transmitted, a repetition number of the NPUSCH, or a HARQ process number. When there are two or more NPUSCH scheduling carriers that may be implicitly mapped, the two or more NPUSCH scheduling carriers may be explicitly distinguished and indicated by the DCI.

The BS may configure the NPDCCH monitoring carrier for monitoring the NPDCCH after the NPUSCH is transmitted. NPUSCH format 1 is indicated through the UL grant of the NPDCCH. ACK/NACK for transmission of the indicated NPUSCH format 1 may be indirectly acquired from the UL grant of the NPDCCH. More specifically, the BS does not explicitly transmit ACK/NACK for the NPUSCH transmitted by the UE. Upon successfully decoding the NPUSCH, the BS does not transmit ACK. Upon failing to decode the NPUSCH, the BS transmits the NPDCCH for retransmission of the NPUSCH to the UE. In this case, the NPDCCH includes the UL grant for retransmitting the NPUSCH and may be included in the UL grant in the form in which a new data indicator (NDI) for the HARQ process number of the NPUSCH transmitted by the UE is not toggled. Upon not receiving the NPDCCH for retransmission of the NPUSCH, the UE recognizes that the BS has successfully decoded the NPUSCH. Accordingly, the UE indirectly receives ACK/NACK indicated from the NDI for the HARQ process number of the transmitted NPUSCH. In the LTE system, the above ACK/NACK feedback method is referred to as asynchronous ACK/NACK.

After repeatedly transmitting the NPUSCH, the UE needs to monitor the NPDCCH in order to check whether the UL grant indicating new transmission of a corresponding HARQ process number is present. However, before repetitive transmission of the NPUSCH is completed, the BS may stop repetitive transmission of the NPUSCH for UL early termination. Then, the UE may monitor the NPDCCH during a specific duration while repetitive transmission of the NPUSCH is performed. Therefore, NPDCCH monitoring carriers in which the UE needs to monitor the NPDCCH before and after repetitive transmission of the NPUSCH is completed may be different and NPDCCH DCI formats may also be different.

For example, the NPDCCH monitoring carrier for monitoring the NPDCCH before repetitive transmission of the NPUSCH is completed, for early termination of the NPUSCH, may be the same as the NPUSCH scheduling carrier for transmitting the NPUSCH. In this case, the NPDCCH monitoring carrier may be configured with a size smaller than a DCI format of the NPDCCH for the DL/UL grant. When the number of UL subframes is greater than the number of DL subframes by a predetermined ratio (e.g., in the case of UL heavy), the NPDCCH monitoring carrier may be indicated by another carrier according to a specific equation. Alternatively, in order to reduce a frequency retuning gap of the UE, the NPDCCH monitoring carrier may be bundled and transmitted in one carrier.

After completing repetitive transmission of the NPUSCH, the NPDCCH monitoring carrier may be the same as a carrier for DL/UL grant scheduling. However, if the NPDCCH monitoring carrier is different from the carrier for DL/UL grant scheduling, scheduling delay information of the DCI may be differently interpreted. For example, scheduling delay may be interpreted as a value larger by a specific value in consideration of a DL/UL switching time and an RF retuning time. In this case, the scheduling delay is a time gap of NPDCCH-NPDSCH, NPDCCH-NPUSCH f/1, or NPDSCH-NPUSCH f/2 and may be indicated through the DCI.

[Method #8 Information of Configured Carriers]

When a plurality of carriers is configured, information of the configured carriers may include at least one of system information, quasi co-located (QCL) information, or measurement carrier information.

In an in-band mode, multiple configured carriers may be limitedly included in the same LTE carrier component (CC). Otherwise, the configured carriers may differ in TDD UL/DL configuration and special subframe configuration.

If there is a set that shares the same system information (e.g., an operation mode, a TDD UL/DL configuration, a TDD special subframe configuration, etc.) between the configured carriers, carriers sharing the same system information may be grouped to form a pair to which system configuration information may be simultaneously allocated.

QCL may be satisfied between multiple configured carriers. For example, QCL may be all satisfied in a configured multi-carrier set. Alternatively, QCL may be satisfied in a specific carrier pair in the configured multi-carrier set. In this case, QCL may mean that secondary characteristics of channels between the carriers are the same or that a channel measurement result may be shared between the carriers. For example, if QCL is satisfied between the NPDCCH monitoring carrier and the NPDSCH scheduling carrier, the UE may use channel information obtained during an NPDCCH monitoring duration for channel estimation of the NPDSCH scheduling carrier.

When the NPUSCH scheduling carrier and the NPDCCH monitoring carrier, and/or the NPUSCH scheduling carrier and the NPDSCH scheduling carrier are different, the UE may require a frequent frequency retuning process, for radio resource management (RRM) and radio link monitoring (RLM) measurement, DL path loss detection for UL power control, and signal strength/quality (e.g., RSRP/RSRQ) measurement. In NB-IoT, the frequency retuning process may be fatal to power consumption. Accordingly, when the NPUSCH scheduling carrier and the NPDCCH monitoring carrier, and/or the NPUSCH scheduling carrier and the NPDSCH scheduling carrier are different, a carrier for the above measurement may be configured as the NPUSCH scheduling carrier. Accordingly, when it is not necessary to receive the NPDSCH and/or the NPDCCH during NPUSCH transmission, the UE may perform RRM and RLM measurement, DL path loss detection for UL power control, and signal strength/quality (e.g., RSRP/RSRQ) measurement, in the NPUSCH scheduling carrier which is being used.

Since RLM is generally representative of the performance of the NPDCCH, RLM should be measured based on the NPDCCH monitoring carrier. Therefore, even if multiple carriers are configured, RLM should be measured based on the NPDCCH monitoring carrier. In this case, when there are two or more NPDCCH monitoring carriers, RLM may be measured based on one specific carrier of the two NPDCCH monitoring carriers. For example, the carrier for measuring RLM may be a carrier having a large number of valid DL subframes, a carrier having the largest or smallest number of repetitive transmissions, or a carrier having the highest or lowest NRS power, a USS carrier, or a CSS carrier, among the two or more NPDCCH monitoring carriers. Alternatively, RLM is measured in all of the two or more NPDCCH monitoring carriers and an average of the measured RLM values may be calculated according to a preset method.

However, when the NPUSCH scheduling carrier and the NPDCCH monitoring carrier, and/or the NPUSCH scheduling carrier and the NPDSCH scheduling carrier are different, the UE may require a frequent frequency retuning process, RRM and RLM measurement, DL path loss detection for UL power control, and signal/quality (e.g., RSRP/ RSRQ) measurement. In NB-IoT, the frequency retuning process may be fatal to power consumption. Accordingly, when the NPUSCH scheduling carrier and the NPDCCH monitoring carrier, and/or the NPUSCH scheduling carrier and the NPDSCH scheduling carrier are different, a carrier for the above measurement may be configured as the NPUSCH scheduling carrier. Unlike the FDD system, in the case of the TDD system, a spacing between one or more DL carriers and one or more UL carriers may not be large in frequency. For example, when NB-IoT operates in the in-band mode, all established carriers may be present within the bandwidth of the LTE system. In this case, even if multiple transmit/receive NB-IoT carriers are configured and channel characteristics are measured using any carrier selected from among the multiple configured carriers, large-scale channel characteristics may be similar. Thus, when a plurality of carriers is allocated to the UE in the TDD system, the UE may be allowed to measure channel characteristics using one or more arbitrary carriers. For example, the UE may measure the channel characteristics using a DL signal in a carrier configured as a UL carrier. Accordingly, when it is not necessary to receive the NPDSCH and/or the NPDCCH during NPUSCH transmission, the UE may perform RRM and RLM measurement, DL path loss detection for UL power control, and signal strength/quality (e.g., RSRP/RSRQ) measurement in the NPUSCH scheduling carrier which is being used. According to an embodiment, RLM may be measured based on the NPDSCH scheduling carrier.

[Method #9 Restriction Condition of Cross-Carrier Scheduling]

When cross-carrier scheduling is configured or activated, restrictions may occur on interlacing scheduling or continuous transmission/reception.

If a UL carrier and a DL carrier are the same in the TDD system, a guard gap for frequency retuning may not be needed. However, if the DL carrier and the UL carrier are different as cross-carrier scheduling is configured or activated, a gap for frequency retuning may be additionally required between continuous transmission/reception of the UE. In this case, the gap may be differently configured for each UE or the same gap may be configured for all UEs. Alternatively, the gap may be differently configured according to a difference in frequency between the UL carrier and the UL carrier.

In addition, when the UL carrier and the DL carrier are the same, interlacing scheduling capable of performing DL/UL scheduling may be applied to alternately perform transmission/reception. Therefore, when cross-carrier scheduling is configured or activated, there may be constraints on applying interlacing scheduling. Then, when cross-carrier scheduling is configured or activated, the UE may be allowed not to expect interlacing scheduling and there may be some restrictions on applying interlacing scheduling according to a specific condition (e.g., gap interval and UL/DL configuration).

[Method #10 Narrowband Reference Signal (NRS) Subframe Designation]

When cross-carrier scheduling is configured or activated, a subframe duration in which an NRS may be expected in each carrier may be extended.

Even in legacy FDD NB-IoT, the UE may not expect the NRS in all valid DL subframes of a non-anchor carrier. However, when the UE monitors the NPDCCH or receives a scheduled NPDSCH in the corresponding non-anchor carrier, the UE may expect the NRS in partial subframes before/after the NPDCCH and NPDSCH that the UE desires to receive in a valid DL subframe according to a search space, a DCI format that has scheduled the NPDSCH, and an RNTI. The above-described method has been introduced so that the BS does always not transmit the NRS in the valid DL subframe of the non-anchor carrier. Unlike the anchor carrier in which the UE performs measurement, in the non-anchor carrier, this method is performed because the NRS is used only for reception or synchronization tracking of the NPDCCH/NPDSCH.

Likewise, even when cross-carrier scheduling is applied, it may be difficult for the UE to expect the NRS in all valid DL subframes. However, in order to compensate for a problem that cross-subframe channel estimation is not performed for a long time in a corresponding carrier due to cross-carrier scheduling, it is necessary to further extend a subframe duration in which the UE may expect the NRS. Therefore, a minimum value of NPDCCH-to-NPDSCH scheduling delay may be defined or interpreted as a different value depending on whether the NPDSCH and the NPDSCH are transmitted in the same carrier. If the NPDCCH simultaneously schedules a plurality of NPDSCHs (e.g., a plurality of DL HARQ processes) and respective DL HARQ processes are transmitted in different carriers, a minimum gap should be secured not only for NPDCCH-to-NPDSCH scheduling delay but also for the NPDSCHs having different HARQ processes.

[Method #11 Method of Securing Time Gap for Frequency Retuning Between Different Carriers]

As described above, when cross-carrier scheduling is configured or activated, there may be constraints on applying continuous transmission/reception or interlacing scheduling of the UE. For example, if the DL carrier and the UL carrier are different, a time gap for frequency retuning may be needed to switch operations between a transmission operation and a reception operation. If the time gap for frequency retuning is not secured, it may be difficult to use the last interval of a channel transmitted before frequency is retuned and/or the last interval of a subsequently transmitted channel. Accordingly, a method of securing the time gap for frequency retuning is needed. A different method may be applied to the time gap for frequency retuning according to the operation mode of a carrier. For example, when the DL carrier and the UL carrier are different, some symbols, some subframes, or a portion of one symbol may be punctured to configure the time gap for frequency retuning of the UE. In this case, a punctured duration may be configured by the first or last of UL symbols, the first or last of DL symbols, or a combination of UL and DL symbols of the above-described duration. In this case, the punctured duration may vary according to whether a reference signal is included therein.

In a transmission channel including the punctured duration, data may be rate-matched in a duration except for the punctured duration according to the number of repetitive transmissions of the channel. For example, if the number of repetitive transmissions is smaller than a specific value, the data may be rate-matched. When the number of repetitive transmissions is greater than the specific value, the channel may be configured and transmitted in the remaining time duration after puncturing a corresponding time duration in the same manner as in a non-punctured duration.

A duration used to secure the time gap for frequency retuning and restrictions on interlacing scheduling or on transmission/reception may vary according to an operation mode of a corresponding carrier. In this case, the time gap for frequency retuning may vary according to the operation mode of a carrier used after frequency retuning. For example, when retuning frequency from a UL carrier to a DL carrier, a 1 ms time gap may not be needed if the DL carrier is in the in-band mode.

However, even in the above-described case, the UE may not expect reception in the first partial symbols (e.g., the first symbol after a CFI value of an LTE legacy UE configured through system information for an NB-IoT UE) or in a portion of the first symbol of an NB-IoT channel within 1 ms. On the other hand, when the UL carrier is in a guard-band mode or a stand-alone mode, the UE may not expect the NB-IoT channel for the first 1 ms or the NB-IoT channel for a time of a slot unit. That is, a method of securing the time gap for frequency retuning may vary depending on whether the duration in which the UE does not expect to receive the NB-IoT channel/signal is included in the time gap for frequency retuning.

Figure 12:
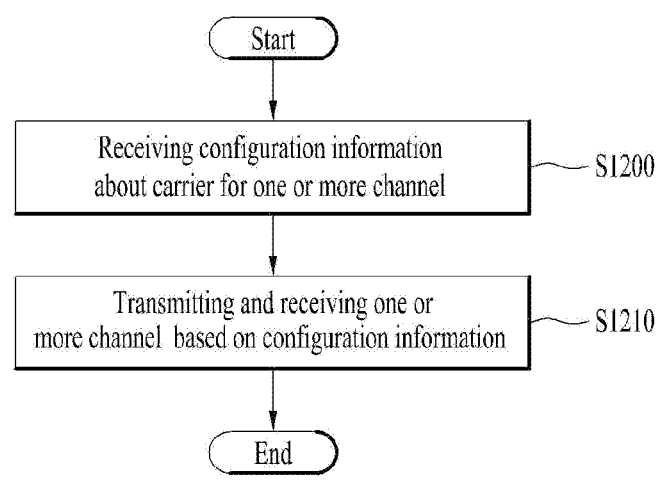
FIG. 12 is a flowchart illustrating a signal transmission and reception method according to the present disclosure.

FIG. 12 is a flowchart illustrating a signal transmission and reception method according to the present disclosure.

Referring to FIG. 12, in step S1200, the UE receives configuration information about a carrier for one or more channels from a BS. In this case, the BS and the UE may be devices that operate in a wireless communication system supporting NB-IoT, without being limited thereto. Different carriers may be configured for the UE by the BS according to the channels. In this case, the one or more channels may include at least one of a DL control channel, a DL shared channel, or a UL shared channel. For example, the one or more channels may include, but are not limited to, at least one of an NPDCCH, an NPDSCH, or an NPUSCH. In addition, the carrier for the one or more channels may include at least one of a carrier for monitoring the NPDCCH, a carrier for receiving the NPDSCH by the UE, or a carrier for transmitting the NPUSCH by the UE. In this case, the carrier for monitoring the NPDCCH, the carrier for receiving the NPDSCH, and the carrier for transmitting the NPUSCH may correspond to the aforementioned NPDCCH monitoring carrier, the NPDSCH scheduling carrier, and the NPUSCH scheduling carrier, respectively.

The UE may be configured with different carriers according to the characteristics of the channels even when the channels are channels of the same type. For example, when the BS configures one or more carriers for monitoring the NPDCCH for the UE, different carriers may be configured for the UE according to at least one of a search space, a CE level, or an RRC state for monitoring the NPDCCH. In addition, when carriers for monitoring a plurality of NPDCCHs are configured, a priority of carriers used by the UE to monitor the NPDCCHs among the plural carriers may be configured. Accordingly, the UE may selectively monitor a specific carrier among the plural configured carriers according to the priority. In this case, the priority may be determined according to at least one of an index of each of the plural configured carriers, the maximum number of repetitive transmissions of the NPDCCH, or an operation performed by the UE before monitoring the NPDCCH. As another example, when the UE is configured with one or more carriers for receiving the NPDSCH, different carriers may be configured according to at least one of content transmitted through the NPDCCH, a CE level, the maximum number of repetitive transmissions of the NPDSCH, or a carrier for monitoring the NPDCCH that schedules the NPDSCH. In this case, although the content transmitted through the NPDSCH may include at least one of system information, a broadcast channel, user data, or a MAC control message, the content is not limited thereto. When the UE is configured with one or more carriers for transmitting the NPUSCH, different carriers may be configured according to at least one of content transmitted through the NPUSCH or a subcarrier spacing. In this case, the content transmitted through the NPUSCH may include, but is not limited to, at least one of ACK/NACK information, a scheduling request message, user data, a MAC control message, an RRC message, or a higher layer message.

When a plurality of different carriers is configured for the UE, carriers having the same system information among the plural different carriers may be configured as one group. The system information of the carriers configured as one group may be simultaneously allocated. In this case, the system information may include at least one of information about an operation mode, information about a UL/DL configuration, or information about a TDD special subframe configuration.

In addition, when carriers for transmitting the DL control channel, the DL shared channel, and the UL shared channel are different, a carrier in which the UE performs measurement may be configured as a predefined specific carrier. Generally, since RLM operates based on a carrier for the DL control channel (e.g., NPDCCH), a carrier for measuring RLM may be limited to a carrier for monitoring the NPDCCH. In this case, when carriers for monitoring a plurality of NPDCCHs are configured, the carrier for measuring RLM may be limited to one carrier selected from among the plural carriers according to a predefined criterion. For example, the carrier for measuring RLM may be limited, but is not always limited, to one carrier selected from a carrier having a large number of valid DL subframes, a carrier having the largest number of maximum repetitive transmissions, a carrier having the smallest number of maximum repetitive transmissions, a carrier having the highest NRS power, a carrier having the lowest NRS power, a USS carrier, and a CSS, among the plural carriers. Alternatively, according to an embodiment, a method of calculating one combined RLM value by measuring RLM values in all of the plural carriers and calculating the measured plural RLM values according to a predefined method may be considered. For example, one combined RLM value may be, but is not limited to, an average of the plural RLM values.

However, as described above, in the case of the TDD system, spacings between one or more DL carriers and one or more UL carriers may not be large in frequency, unlike the FDD system. For example, when NB-IoT operates in an in-band mode, all configured carriers may be present within the bandwidth of the LTE system. In this case, even if a plurality of transmit/receive NB-IoT carriers is configured and channel characteristics are measured using any carrier selected from among the plural configured carriers, large-scale channel characteristics may be similar. Thus, when the plural carriers are allocated to the UE in the TDD system, the UE may be allowed to measure channel characteristics using one or more arbitrary carriers. For example, the UE may measure channel characteristics using a DL signal in a carrier configured as a UL carrier. Accordingly, a carrier for measuring at least one of RRM, RLM, DL path loss for UL power control, or RSRP/RSRQ may be configured as a carrier for a UL shared channel (e.g., NPUSCH).

Referring to FIG. 12, in step S1210, the UE transmits and receives one or more channels based on the received configuration information. When the one or more channels include at least one of the DL control channel (e.g., NPDCCH), the DL shared channel (e.g., NPDSCH), or the UL shared channel (NPUSCH), the UE may receive at least one of the DL control channel or the DL shared channel and transmit the UL shared channel, based on the configuration information.

Figure 13:
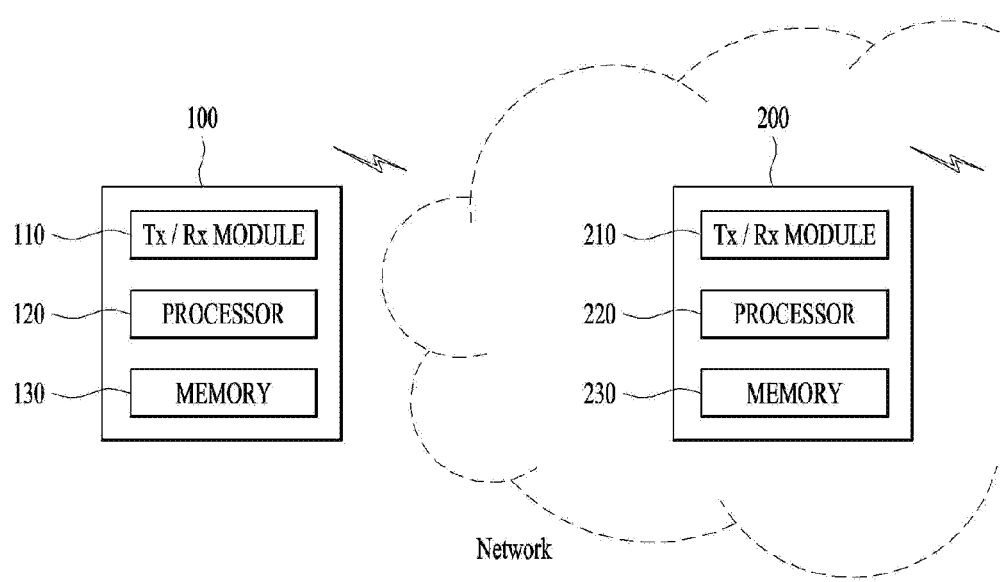
FIG. 13 illustrates a base station and a user equipment applicable to an embodiment of the present disclosure.

FIG. 13 illustrates a BS and a UE of a wireless communication system, which are applicable to embodiments of the present disclosure.

Referring to FIG. 13, the wireless communication system includes a UE 100 and a BS 200. When the wireless communication system includes a relay, UE 100 or the BS 200 may be replaced by the relay.

The UE 100 includes a transceiver 110, a processor 120, and a memory 130.

The transceiver 110 is connected to the processor 120 and transmits and/or receives a radio signal. The processor 120 may be configured to implement the procedures and/or methods proposed by the present disclosure. The memory 130 is connected to the processor 120 and stores information related to operations of the processor 120.

The BS 200 includes a transceiver 210, a processor 220, and a memory 230.

The transceiver 210 is connected to the processor 212 and transmits and/or receives a radio signal. The processor 220 may be configured to implement the procedures and/or methods proposed by the present disclosure. The memory 230 is connected to the processor 120 and stores information related to operations of the processor 220.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The embodiments of the present disclosure may be applied to various wireless access systems. For example, the wireless access systems may include, but are not limited to, a 3rd generation partnership project (3GPP) or 3GPP2 system. The embodiments of the present disclosure may be applied not only to the above-described wireless access systems but also to all technical fields that employ the above-described wireless access systems.

The invention claimed is:

1. A method of transmitting and receiving a signal by a user equipment (UE) in a wireless communication system, the method comprising:
   receiving a narrowband physical downlink control channel (NPDCCH) by monitoring a first carrier;
   based on the NPDCCH scheduling a narrowband physical downlink shared channel (NPDSCH), receiving the NPDSCH based on a second carrier; and
   based on the NPDCCH scheduling a narrowband physical uplink shared channel (NPUSCH), transmitting the NPUSCH based on a third carrier,
   wherein a plurality of carriers are configured for monitoring the NPDCCH, and the first carrier is selected from the plurality of carriers based on a predetermined priority, and
   wherein the second carrier and the third carrier are configured differently from the first carrier.

2. The method of claim 1, wherein the plurality of carriers are configured differently based on at least one of a search space for monitoring the NPDCCH, a coverage enhancement (CE) level, or a radio resource control (RRC) state.

3. The method of claim 1,
   wherein the predetermined priority is determined based on an index of each of the plurality of carriers, a maximum number of repetitive transmissions of the NPDCCH, or an operation performed by the UE before monitoring the NPDCCH.

4. The method of claim 1, wherein, based on the NPDCCH scheduling the NPDSCH, the second carrier is configured based on at least one of content transmitted through the NPDSCH, a coverage enhancement (CE) level, a maximum number of repetitive transmissions of the NPDSCH, or the first carrier for monitoring the NPDCCH.

5. The method of claim 4, wherein the content transmitted through the NPDSCH comprises at least one of system information, a broadcast channel, user data, or a media access control (MAC) control message.

6. The method of claim 1, wherein, based on the NPDCCH scheduling the NPUSCH, the third carrier is configured based on at least one of content transmitted through the NPUSCH or a subcarrier spacing.

7. The method of claim 6, wherein the content transmitted through the NPUSCH comprises at least one of acknowledgement/negative acknowledgement (ACK/NACK) information, a scheduling request message, user data, a media access control (MAC) control message, a radio resource control (RRC) message, or a higher layer message.

8. The method of claim 1,
wherein carriers having the same system information among the first carrier, the second carrier, and the third carrier are configured as one group, and
wherein the system information of the carriers configured as one group is simultaneously allocated.

9. The method of claim 8, wherein the system information comprises at least one of information about an operation mode, information about an uplink/downlink configuration, or information about a time division duplex (TDD) special subframe configuration.

10. The method of claim 1, wherein one or more carriers among the first carrier, the second carrier, and the third carrier are used for measuring at least one of size of a downlink signal or quality of the downlink signal.

11. The method of claim 10, wherein the third carrier is used for measuring at least one of the size of the downlink signal or the quality of the downlink signal.

12. A method of transmitting and receiving a signal by a base station (BS) in a wireless communication system, the method comprising:
transmitting a narrowband physical downlink control channel (NPDCCH) by monitoring a first carrier; and
based on the NPDCCH scheduling a narrowband physical downlink shared channel (NPDSCH), transmitting the NPDSCH based on a second carrier; and
based on the NPDCCH scheduling a narrowband physical uplink shared channel (NPUSCH), receiving the NPUSCH based on a third carrier,
wherein a plurality of carriers are configured for monitoring the NPDCCH and the first carrier is selected from the plurality of carriers based on a predetermined priority, and
wherein the second carrier and the third carrier are configured differently from the first carrier.

13. A user equipment (UE) operating in a wireless communication system, the UE comprising:
a transceiver; and
a processor, wherein the processor is configured to:
receive a narrowband physical downlink control channel (NPDCCH) by monitoring a first carrier; and
based on the NPDCCH scheduling a narrowband physical downlink shared channel (NPDSCH), receive the NPDSCH based on a second carrier; and
based on the NPDCCH scheduling a narrowband physical uplink shared channel (NPUSCH), transmitting the NPUSCH based on a third carrier,
wherein a plurality of carriers are configured for monitoring the NPDCCH and the first carrier is selected from the plurality of carriers based on a predetermined priority, and
wherein the second carrier and the third carrier are configured differently from the first carrier.

14. A base station (BS) operating in a wireless communication system, the BS comprising:
a transceiver; and
a processor, wherein the processor is configured to:
transmit a narrowband physical downlink control channel (NPDCCH) by monitoring a first carrier; and
based on the NPDCCH scheduling a narrowband physical downlink shared channel (NPDSCH), transmit the NPDSCH based on a second carrier; and
based on the NPDCCH scheduling a narrowband physical uplink shared channel (NPUSCH), receive the NPUSCH based on a third carrier,
wherein a plurality of carriers are configured for monitoring the NPDCCH and the first carrier is selected from the plurality of carriers based on a predetermined priority, and
wherein the second carrier and the third carrier are configured differently from the first carrier.

* * * * *